Jan. 13, 1942.  D. M. WRIGHT  2,270,015
COMBINED KEY CASE AND DOCUMENT HOLDER
Filed Jan. 24, 1940
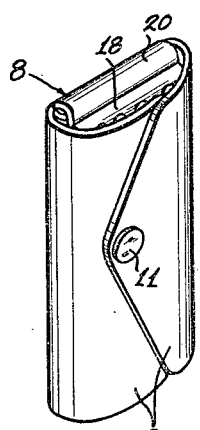
FIG.1.
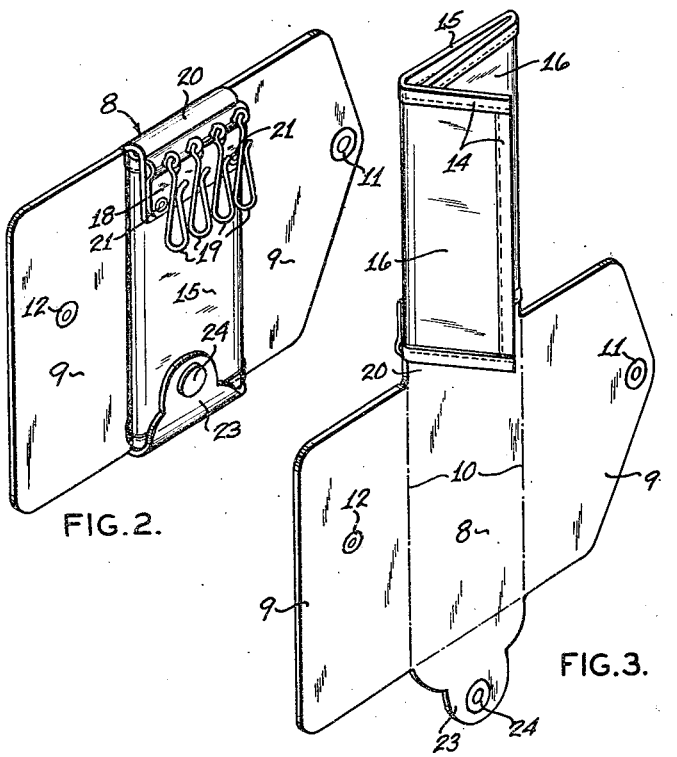
FIG.2.  FIG.3.
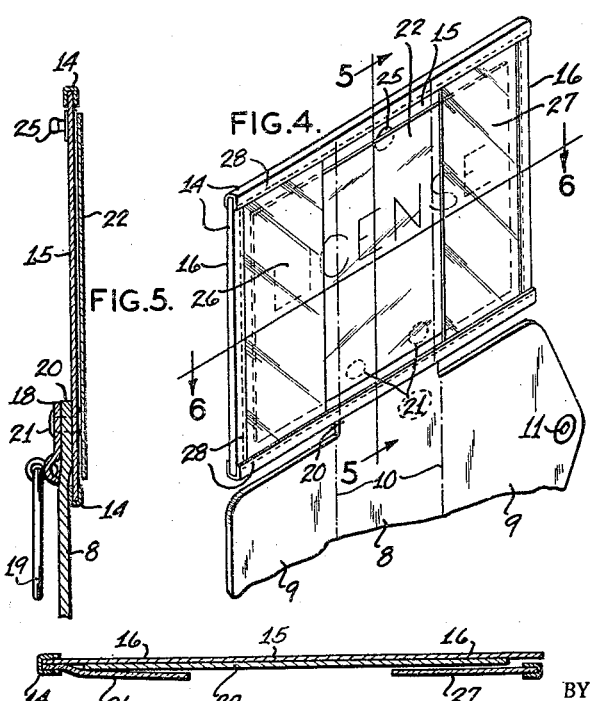
FIG.4.
FIG.5.
FIG.6.
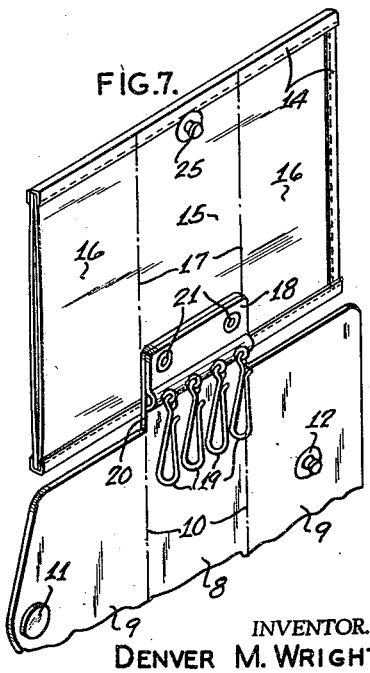
FIG.7.
INVENTOR.
DENVER M. WRIGHT
BY Albert J. McCauley
ATTORNEY.

Patented Jan. 13, 1942

2,270,015

UNITED STATES PATENT OFFICE 2,270,015

COMBINED KEY CASE AND DOCUMENT HOLDER

Denver M. Wright, Brentwood, Mo.

Application January 24, 1940, Serial No. 315,323

1 Claim. (Cl. 150—35)

This invention relates to a combined key case and document holder, and more particularly to a device wherein a document holder is foldable from a position within a case to an exposed position outside of the case. Certain novel features appear in the document holder itself, and my object is to claim these features, as well as the combinations of details.

More specifically stated, an object is to produce a simple and compact device of this kind, adapted for most convenient use by persons who are required to carry keys as well as a license or other document associated with the keys. For example, an automobile driver is usually required to carry keys for the automobile, in addition to a driver's license. The present invention provides a foldable case wherein the keys can be readily exposed for convenient frequent use, while the license is concealed in a folded position where it is available for display without detaching the license from the key holder. The license is thus associated with the keys required to operate the automobile, so the driver is assured of having the required license whenever he is engaged in operating the vehicle. Furthermore, the license is enclosed and preserved in a neat and clean condition while available for display whenever one of the keys is in service.

With the foregoing and other objects in view, the invention comprises the novel construction, combination and arrangement of parts hereinafter more specifically described and shown in the accompanying drawing, which illustrates one form of the invention. However, it is to be understood that the invention comprehends changes, variations and modifications within the scope of the claim hereunto appended.

Fig. 1 is a perspective view of a device embodying the features of this invention, showing the outer case in its folded condition wherein it encloses the document holder and the key holder.

Fig. 2 is a similar view showing the side wings of the outer case in unfolded positions to expose the key holder, while the document holder is folded to enclose and protect the document.

Fig. 3 is a similar view showing the document holder as it appears when moved to an upright position above the case and partly unfolded.

Fig. 4 is a fragmentary perspective view showing the extended document holder as it appears when unfolded to expose the document.

Fig. 5 is a vertical section on the line 5—5 in Fig. 4.

Fig. 6 is a horizontal section on the line 6—6 in Fig. 4.

Fig. 7 is a view similar to Fig. 4, showing the opposite side of the unfolded device.

To illustrate one form of the invention, I have shown an outer case comprising a web of flexible leather, or other suitable sheet material, including a middle section 8 and side wings 9 foldable at the imaginary dot and dash lines 10 to lapped positions over said middle section. As shown in Fig. 1, the folded wings may be detachably united by any suitable fastening means, such as a snap fastener, or glove fastener shown at 11 and 12.

The document holder, or license holder, is a foldable article and may include a back member provided with a marginal frame 14 and having a middle section 15 and side wings 16 foldable at the lines 17 to lapped positions on the middle section.

The key holder may include a metallic plate 18 at the rear of said middle section 15, and snap hooks 19, or the like, pivotally suspended from said metallic plate.

The combined document holder and key holder is suitably hinged to the outer case. For example, the hinge may be formed by a foldable tab 20 formed integral with and extending from the upper portion of the middle section 8. This tab 20 extends between the metallic plate 18 and the rear face of the middle section 15 of the document holder, and these several elements may be united by means of attaching devices 21, in the form of rivets or eyelets.

The foldable hinge-tab 20 may occupy an extended position (Figs. 3, 4 and 7) wherein the wings 16 can be unfolded to expose the frame 14 and license, or other document, 22. It will also be observed that the wings 16 of the license holder are foldable onto the middle section 15, and that the folded license holder is movable on the hinge-tab 20 to a closed position wherein one of the lapped wings 16 contacts with the middle section 8 of the outer case. The upper margin of the license holder is then secured by the hinge-tab 20, and the lower margin may be secured by means of an attaching tab 23 shown in Figures 2 and 3. This attaching tab extends from the lower portion of the middle section 8, and it is foldable over the lower portion of the middle section 15 of the document holder, as shown in Fig. 2. A snap fastener, or glove fastener including members 24 and 25, may be employed to attach said tab 23 to the middle section 15 of the folded document holder. Said document holder is thus normally secured in its folded condition, wherein it does not in any way interfere with the other movable parts of the device. From another viewpoint, the key holder is secured to the hinge tab 20, but the attaching tab 23 at the bottom of the device normally prevents movement on this hinge, thereby preventing objectionable displacement of both the key holder and the folded document holder.

When the license, or other document, is unfolded and exposed, it occupies an upright position above the elements of the outer case, and the hinge tab 20 then appears at the bottom of the upright license holder. However, when this license holder is folded and secured as shown in Fig. 2, it occupies an inverted position, and the key holder is then exposed at the top of the inverted license holder. It will also be observed that the key holder is then located at the upper portion of the outer case, and when this outer case is folded, as shown in Figure 1, it is open at the top. Therefore, any one of the key-receiving hooks 19 may extend from the open top of the folded outer case, at a point above the folded license holder, and the selected key may be employed while all of the other elements are secured within the folded outer case.

Attention is now directed to details of the document holder, or license holder. Transparent strips 26 and 27 are carried by the pair of foldable wings 16. Each of these transparent strips is approximately coextensive with its wing, and the strips do not overlap the middle section 15 of the document holder. As a consequence, the wings can be folded and unfolded without bending or breaking the transparent strips. As shown in Figures 4 and 6, the strip 26 has its top, bottom and outer side margins secured to corresponding margins of the adjacent wing by means of stitching 28 which passes through the frame 14, but the inner side margin of this transparent strip 26 is separable from the wing, so as to provide a document-receiving pocket. The companion strip 27 is likewise secured at its top and bottom margins, but both of the vertical side margins of this strip are free of direct connection with the wing. In other words, the pair of transparent strips provide pockets at opposite sides of the middle section 15, and the outer side margin of the strip 27 is separable from its wing, so as to provide an entrance for the document.

The tape, forming the frame 14 around the document holder, may be applied directly to both faces of the middle section 15, as shown in Fig. 5, and directly to both faces of the free outer side margin of the transparent strip 27, as shown in Fig. 6.

I claim:

In a combined key case and holder for foldable documents, an outer case having a middle section and side wings foldable over said middle section, a document holder foldable with the foldable document, said document holder having a middle section to receive the middle portion of the document and a pair of side wings extending from opposite sides of the middle section of said document holder to receive the side portions of the document, said side wings of the document holder being foldable to lapped positions at the front of the middle section of said document holder, so as to fold and conceal the document, the last mentioned side wings being normally folded and concealed between the middle sections of said case and document holder, the rear face of said middle section of the document holder being exposed when its folded side wings are confined between the two middle sections, a key holder secured to and extending from said exposed rear face of the middle section of the document holder, and a marginal hinge connecting said middle section of the document holder to the middle section of said case, the side wings of said case being foldable over said rear face of the middle section of the folded document holder to cover the key holder on said rear face, and all of the elements of said key holder and document holder being movable as a unit about the axis of said hinge to simultaneously shift said key holder and release the folded document holder.

DENVER M. WRIGHT.